Dec. 8, 1942.   C. A. PRATT   2,304,419
CONVEYER
Filed Oct. 7, 1940
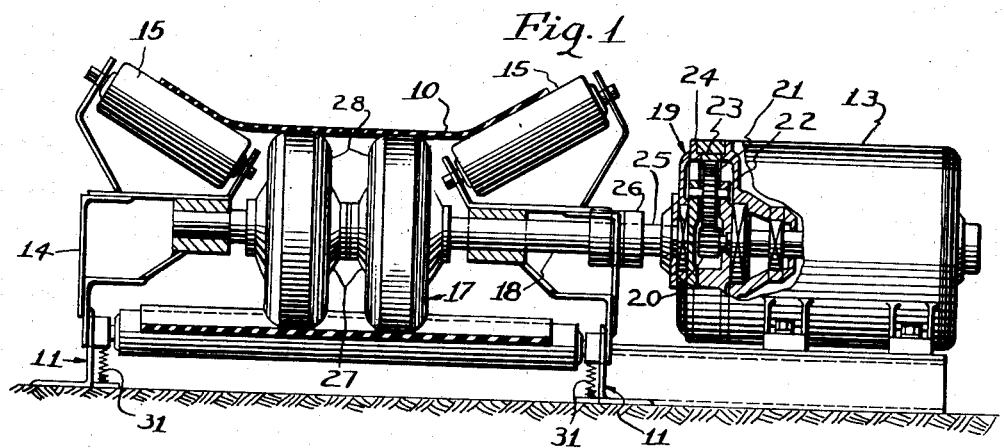
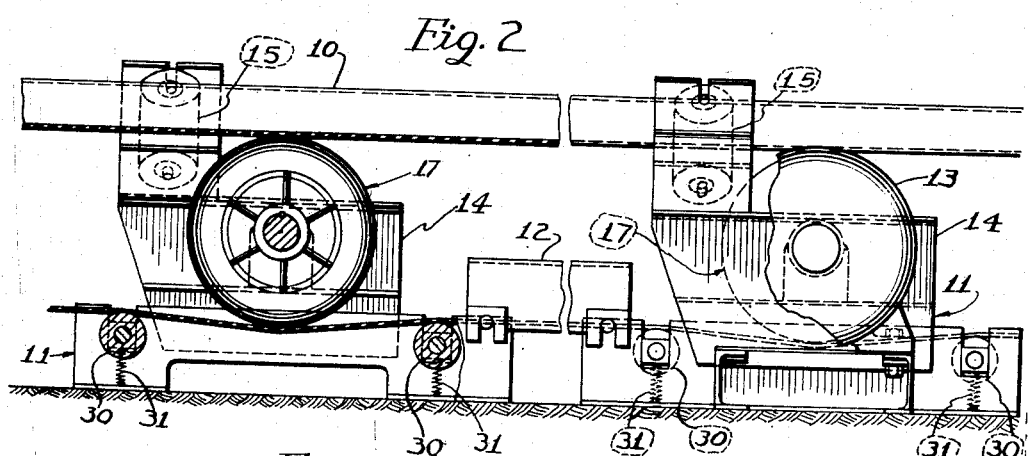
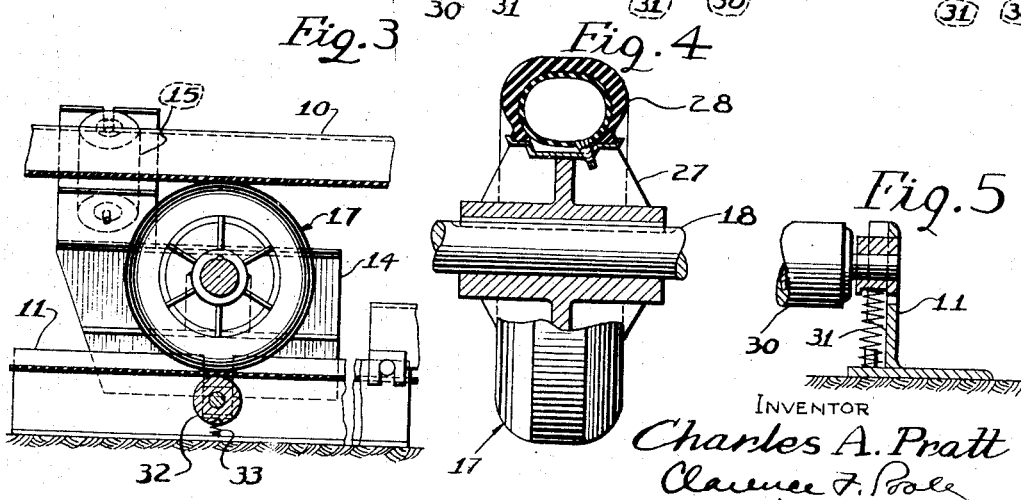
INVENTOR
Charles A. Pratt
Clarence F. Poole
ATTORNEY Patented Dec. 8, 1942

2,304,419

UNITED STATES PATENT OFFICE 2,304,419

CONVEYER

Charles A. Pratt, Chicago, Ill., assignor to Goodman Manufacturing Company, Chicago, Ill., a corporation of Illinois Application October 7, 1940, Serial No. 360,045

2 Claims. (Cl. 198—203)

This invention relates to improvements in conveyers, and more particularly relates to improvements in a supporting and driving means for a belt conveyer of the sectional type.

It has heretofore been customary to drive the belt of a belt conveyer by the application of power to a drive pulley disposed at or closely adjacent the discharge end of the conveyer. Since the conveyer belt supports the material discharged onto it and also transmits the motion of the drive pulley to this material, which pulley is disposed closely adjacent the discharge end of the belt, the greatest load on the belt is at the drive pulley and the practical length of the conveyer is limited by the strength that can be built into the belt. Thus the maximum length of the conveyer is reached when a further increase in thickness of the belt is impractical.

The principal objects of my present invention are to reduce the stresses on a conveyer belt and to permit the maximum length of belt conveyers to be increased, by providing a means for supporting and driving the belt at various points along its length.

A more specific object of my invention is to provide a sectional conveyer of a novel and improved construction which includes a plurality of spaced apart independent belt supporting and drive units disposed along the length of the conveyer belt for supporting and driving the conveyer belt.

Other objects of my invention will appear from time to time as the following specification proceeds and with reference to the accompanying drawing wherein:

Figure 1 is an end view of a drive unit constructed in accordance with my invention, with the belt shown in transverse section, and with certain parts of the drive mechanism broken away and certain other parts shown in section;

Figure 2 is a view in side elevation of a portion of a conveyer, illustrating the arrangement of the supporting and drive units along the conveyer;

Figure 3 is a fragmentary view in side elevation showing a modified form of supporting and drive unit, with a different arrangement for engaging the inside of the lower run of the belt with the drive pulley than is shown in Figures 1 and 2;

Figure 4 is an enlarged fragmentary end view of one of the drive pulleys, with certain parts broken away and certain other parts shown in transverse section; and Figure 5 is an enlarged fragmentary detail view illustrating the yieldable support for the rollers which serve to engage the inside of the lower run of the belt with the drive pulley.

In the drawing, the embodiment of my invention illustrated includes generally a belt 10 which is herein shown as being of the trough type and which may be supported on a plurality of spaced apart belt supporting and drive units 11, 11. Said belt supporting and drive units may be held in spaced relation with respect to each other by means of spacing members 12, 12, detachably engaging said units at their ends, and any number of said units may be provided depending upon the length to which it is desired to extend the conveyer. Each of said drive units is provided with an independent drive motor 13. Said motors may be synchronized in a manner well known to those skilled in the art, so that each motor will rotate at the same speed.

Each belt supporting and drive unit 11 includes a frame 14 having a pair of spaced apart inclined idler rollers 15, 15 mounted adjacent opposite sides thereof, so that their axes of rotation are inclined downwardly towards the center of said frame, for supporting the edges of said belt in a trough-like formation, in a manner usual with trough belt conveyers. The central portion of the belt is adapted to be supported by a drive pulley 17, mounted in said frame on a shaft 18, driven from the motor 13 through reduction gearing generally indicated by reference character 19.

The reduction gearing 19 may be of any usual type, but as herein shown, includes a motor pinion 20 meshing with planetary pinions 21, 21 mounted in a rotatable cage 22. Said planetary pinions mesh with an internal gear 23 fixed from rotation and mounted in a casing 24 for said reduction gearing, which casing is herein shown as forming a housing for the pinion end of the motor 13. The cage 22 is secured to a shaft 25, and drives said shaft upon orbital movement of said planetary pinions about said internal gear. A flexible coupling 26 is provided to connect said last mentioned shaft with the shaft 18, for driving the drive pulley 17.

The drive pulley 17 may be of any usual type, but is herein shown as being of a yieldable construction formed from a pair of spaced apart wheels 27, 27 having yieldable belt supporting and engaging members 28, 28 mounted on the outer periphery thereof. Said belt supporting and engaging members are herein shown as being in the form of rubber tires of the type similar to that used for automobiles. Said tires may be provided with an inflatable inner tube or, in order to insure a more constant drive force and pressure to each tire, may be filled with sponge rubber.

The inner side of the lower run of the belt may be engaged with each drive pulley 17 by means of spaced apart idler rollers 30, 30 mounted in opposite sides of the frame 14, for vertical movement with respect thereto. As herein shown, yieldable members such as compression springs 31, 31 are provided, to urge said idler rollers in an upward direction to engage the outside of the lower run of the belt, and to hold the inner side of the lower run of the belt in engagement with said drive pulley. Said idler rollers are herein shown as being spaced beneath the drive pulley 17 on opposite sides of its center so as to give a slight wrap of the belt around said drive pulley, but may be arranged to wrap the belt around said drive pulley a greater amount than shown, if desired.

In the modified form of the invention shown in Figure 3, the lower run of the belt is engaged with the drive pulley 17 by means of a pinch or wringer roll 32, yieldably engaged with the outside of the lower run of the belt, by compression springs 33, 33. If desired, said pinch roll may be driven by power at the same peripheral speed as the speed of the drive pulley 17.

It may be seen from the foregoing that a new and improved form of supporting and drive means for a belt conveyer has been provided, which consists of a plurality of spaced apart independent drive units including drive pulleys supporting the upper run of the belt and idler rollers engaging the inside of the lower run of the belt with said drive pulleys. It may further be seen that the drive to the belt is of a novel and simplified construction and may be provided at a plurality of points along its length, thus doing away with a terminal drive pulley and decreasing the stresses on the belt at the drive pulley and permitting the maximum length of the belt conveyer to be increased without increasing the thickness of the belt.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a portable and extensible conveyer, an endless conveyer belt, a plurality of independent drive units for supporting and driving said conveyer belt at various points along the conveyer intermediate the ends thereof, and a plurality of spacing members having detachable connection with said drive units, for detachably connecting said drive units together and holding said drive units in spaced apart relation with respect to each each other at various points along the belt.

2. In a portable and extensible conveyer, an endless conveyer belt, a plurality of longitudinally spaced independent drive units for supporting and driving said conveyer belt at various points along the conveyer, intermediate the ends of said belt, and a plurality of longitudinally extending parallel spaced spacing members having detachable connection with said drive units at their ends and holding said drive units in spaced apart relation with respect to each other.

CHARLES A. PRATT.